(12) United States Patent
Hori et al.

(10) Patent No.: US 8,272,473 B2
(45) Date of Patent: Sep. 25, 2012

(54) ACTIVE STEERING CONTROL SYSTEM

(75) Inventors: Masashi Hori, Anjo (JP); Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 39 days.

(21) Appl. No.: 12/835,054

(22) Filed: Jul. 13, 2010

(65) Prior Publication Data

US 2011/0011666 A1   Jan. 20, 2011

(30) Foreign Application Priority Data

Jul. 14, 2009   (JP) ................................. 2009-165381

(51) Int. Cl.
B62D 5/04   (2006.01)
(52) U.S. Cl. ....................................... 180/444
(58) Field of Classification Search ......................... None
See application file for complete search history.

(56) References Cited

U.S. PATENT DOCUMENTS

| 5,511,629 | A  | * | 4/1996  | Vogel ............................. | 180/447 |
| 5,719,459 | A  | * | 2/1998  | Hasegawa ....................... | 310/268 |
| 6,012,347 | A  |   | 1/2000  | Hasegawa |         |
| 7,063,180 | B2 | * | 6/2006  | Kojima et al. .................. | 180/444 |
| 7,306,535 | B2 | * | 12/2007 | Menjak et al. .................. | 475/29  |
| 7,520,367 | B2 | * | 4/2009  | Nakatsu et al. ................ | 180/444 |
| 7,665,572 | B2 | * | 2/2010  | Yamanaka et al. ............. | 180/444 |
| 8,006,799 | B2 | * | 8/2011  | Yamanaka ....................... | 180/444 |
| 2005/0173184 | A1 |  | 8/2005  | Kojima et al. |          |
| 2006/0162991 | A1 | * | 7/2006  | Kuehnhoefer et al. ........ | 180/444 |
| 2006/0219465 | A1 |  | 10/2006 | Inoue |           |
| 2008/0179131 | A1 |  | 7/2008  | Inoue |           |
| 2010/0140011 | A1 | * | 6/2010  | Wilkes et al. .................. | 180/444 |
| 2011/0011666 | A1 | * | 1/2011  | Hori et al. ...................... | 180/444 |

FOREIGN PATENT DOCUMENTS

| JP | H02-186150  | 7/1990  |
| JP | H07-208563  | 8/1995  |
| JP | H09-024855  | 1/1997  |
| JP | 2002-213571 | 7/2002  |
| JP | 2007-145273 | 6/2007  |
| JP | 2007-313958 | 12/2007 |
| JP | 2009-061836 | 3/2009  |

OTHER PUBLICATIONS

Japanese Office Action dated Jul. 1, 2011, issued in corresponding Japanese Application No. 2009-165381 with English Translation.

* cited by examiner

*Primary Examiner* — Tony Winner
(74) *Attorney, Agent, or Firm* — Nixon & Vanderhye PC (57) ABSTRACT

An input gear rotates integrally with an input shaft, and an output gear rotates integrally with an output shaft. Pinion gears are rotatably supported by pinion gear shaft members, respectively, and are meshed with both of the input gear and the output gear. An inner end part of each pinion gear shaft member is fitted to an inner peripheral wall of a corresponding primary hole of an inner ring member, and an outer end part of each pinion gear shaft member is fitted to an inner peripheral wall of a corresponding secondary hole of an outer ring member.

15 Claims, 10 Drawing Sheets

ACTIVE STEERING CONTROL SYSTEM

CROSS REFERENCE TO RELATED APPLICATION

This application is based on and incorporates herein by reference Japanese Patent Application No. 2009-165381 filed on Jul. 14, 2009.

BACKGROUND OF THE INVENTION

1. Field of the Invention

The present invention relates to a steering control system, which controls a transmission ratio (hereinafter, referred to as a steering ratio) between a steering angle of a steering wheel and a steering angle of steerable wheels and which provides an assist for a steering force.

2. Description of Related Art

Previously, a variable gear ratio steering (VGRS) apparatus, which controls the steering ratio based on a traveling speed of the vehicle, has been known. At this VGRS apparatus, the steering angle of the steerable wheels relative to the steering angle of the steering wheel is increased at the low traveling speed of the vehicle to improve the maneuverability of the vehicle. In contrast, the steering angle of the steerable wheels relative to the steering angle of the steering wheel is decreased at the high traveling speed of the vehicle to improve the safety of the vehicle.

Furthermore, an electric power steering (EPS) apparatus, which controls the steering force based on the steering torque, has been known. At this EPS apparatus, the steering torque is sensed based on a twist angle of a torsion bar, which is installed to an output shaft of the VGRS apparatus, and the steering force is assisted based on the sensed steering torque. In this way, the maneuvering work load of the driver of the vehicle can be advantageously reduced.

Japanese Unexamined Patent Publication No. 2005-221053A (corresponding to U.S. 2005/0173184A1) teaches one such VGRS apparatus to control the steering ratio. In this VGRS apparatus, an input shaft is connected to a steering wheel, and an output shaft is connected to a steerable wheel side and is placed coaxial with the input shaft. Input gear, which is rotated integrally with the input shaft, and an output gear, which is rotated integrally with the output shaft, are opposed to each other. Intermediate gears are meshed with both of the input gear and the output gear and are rotated about a rotational axis of the input shaft and of the output shaft.

However, in the VGRS apparatus of Japanese Unexamined Patent Publication No. 2005-221053A (corresponding to U.S. 2005/0173184A1), each support shaft, which rotatably supports a corresponding one of the intermediate gears, is formed integrally with a rotation support member, which is placed perpendicular to the support shaft and is coaxial with the input shaft and the output shaft. Therefore, the processing of the rotation support member is difficult. Thereby, it is difficult to increase the number of the support shafts and the number of the intermediate gears to increase a torque transmission capacity between the input gear and the output gear.

Furthermore, in the VGRS apparatus of Japanese Unexamined Patent Publication No. 2005-221053A (corresponding to U.S. 2005/0173184A1), the rotation of the input gear is transmitted to the output gear through the intermediate gears. Therefore, the rotational direction of the output shaft is reversed from the rotational direction of the input shaft. Thereby, in the case where this VGRS apparatus is used in the vehicle that has the steering control system, in which the steering wheel and the output shaft rotate in the same common direction, a gear device, which reverses the steering angle of the output shaft once again, needs to be placed between the output shaft and a steering pinion gear. However, when such a gear device is provided, the size of the entire steering control system may possibly be increased.

Furthermore, in the case of the VGRS apparatus of Japanese Unexamined Patent Publication No. 2005-221053A (corresponding to U.S. 2005/0173184A1), when the EPS apparatus is placed on the axial side of the VGRS apparatus where the steerable wheels are located, the torsion bar needs to be installed to the output shaft located on the axial side of the output gear where the steerable wheels are located. Therefore, the axial distance between the VGRS apparatus and the EPS apparatus is lengthened, and the installability of the VGRS apparatus to the vehicle is deteriorated.

SUMMARY OF THE INVENTION

The present invention addresses the above disadvantages. According to the present invention, there is provided a steering control system for a vehicle, including an input shaft, an output shaft, an input gear, an output gear, an inner ring member, an outer ring member, at least one pinion gear shaft member, at least one pinion gear, a worm wheel, a worm and a drive means. The input shaft is coupleable with a steering wheel of the vehicle, which is steerable by a driver of the vehicle. The output shaft is coaxial with the input shaft and is rotatable relative to the input shaft. The output shaft transmits a steering force toward steerable wheels of the vehicle. The input gear is rotatable integrally with the input shaft. The output gear is opposed to the input gear and is rotatable integrally with the output shaft. The inner ring member is rotatable about a portion of the output shaft, which projects on one axial side of the output gear where the input gear is located. The outer ring member is placed radially outward of the inner ring member. Each of the at least one pinion gear shaft member extends in a corresponding direction that is generally perpendicular to a rotational axis of the input shaft and of the output shaft. Each of the at least one pinion gear shaft member has an inner end part, which is received in a corresponding one of at least one primary hole of the inner ring member, and an outer end part, which is received in a corresponding one of at least one secondary hole of the outer ring member. Each of the at least one pinion gear is rotatably supported by a corresponding one of the at least one pinion gear shaft member at a location between the inner ring member and the outer ring member and is meshed with the input gear and the output gear. The worm wheel is fixed to an outer peripheral wall of the outer ring member. The worm is meshed with the worm wheel. The drive means is for rotating the worm to control a transmission ratio between a rotational angle of the input shaft and a rotational angle of the output shaft.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the present invention will be described with reference to the accompanying drawings.

First Embodiment

Figure 1:
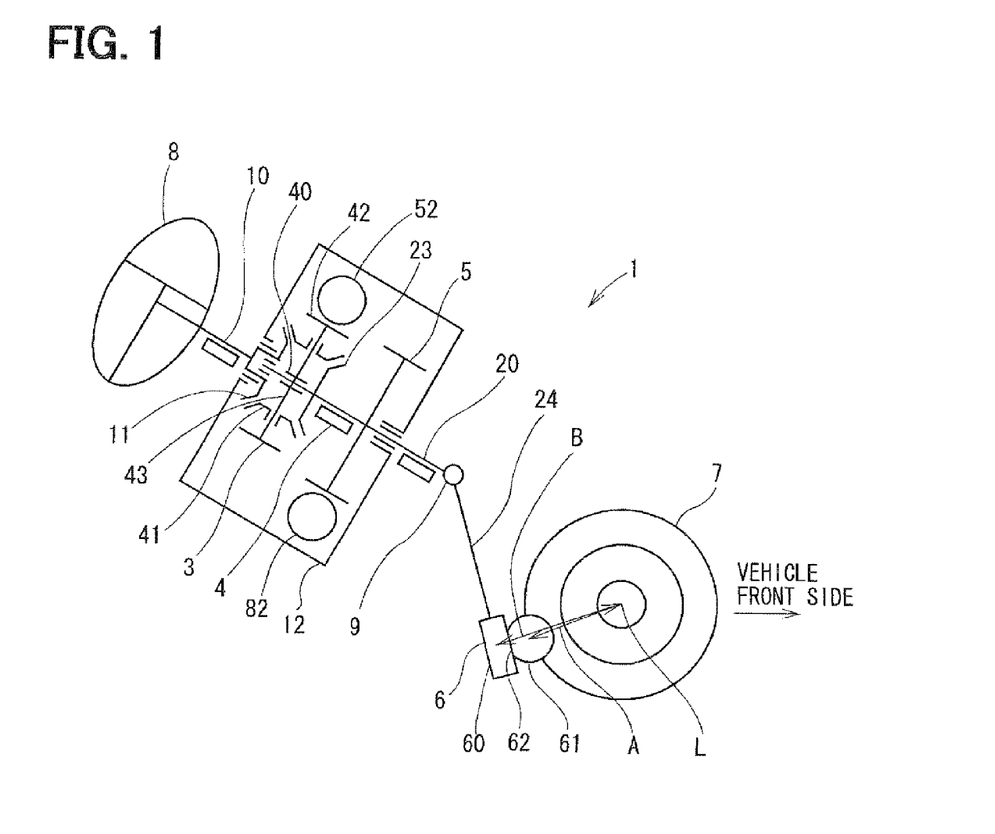
FIG. 1 is a schematic diagram showing a steering control system according to a first embodiment of the present invention.

With reference to FIG. 1, a steering control system according to a first embodiment of the present includes a variable gear ratio steering (VGRS) apparatus 3, a steering torque sensing apparatus 4 and an electric power steering (EPS) apparatus 5. The VGRS apparatus 3 controls a steering ratio. The EPS apparatus 5 assists a steering force based on the steering torque. Furthermore, the steering control system 1 of the present embodiment includes a steering gear box 6 of a rack-and-pinion type. The steering gear box 6 is placed at the side where steerable wheels 7 are located.

First, the VGRS apparatus 3 will be described.

Figure 2:
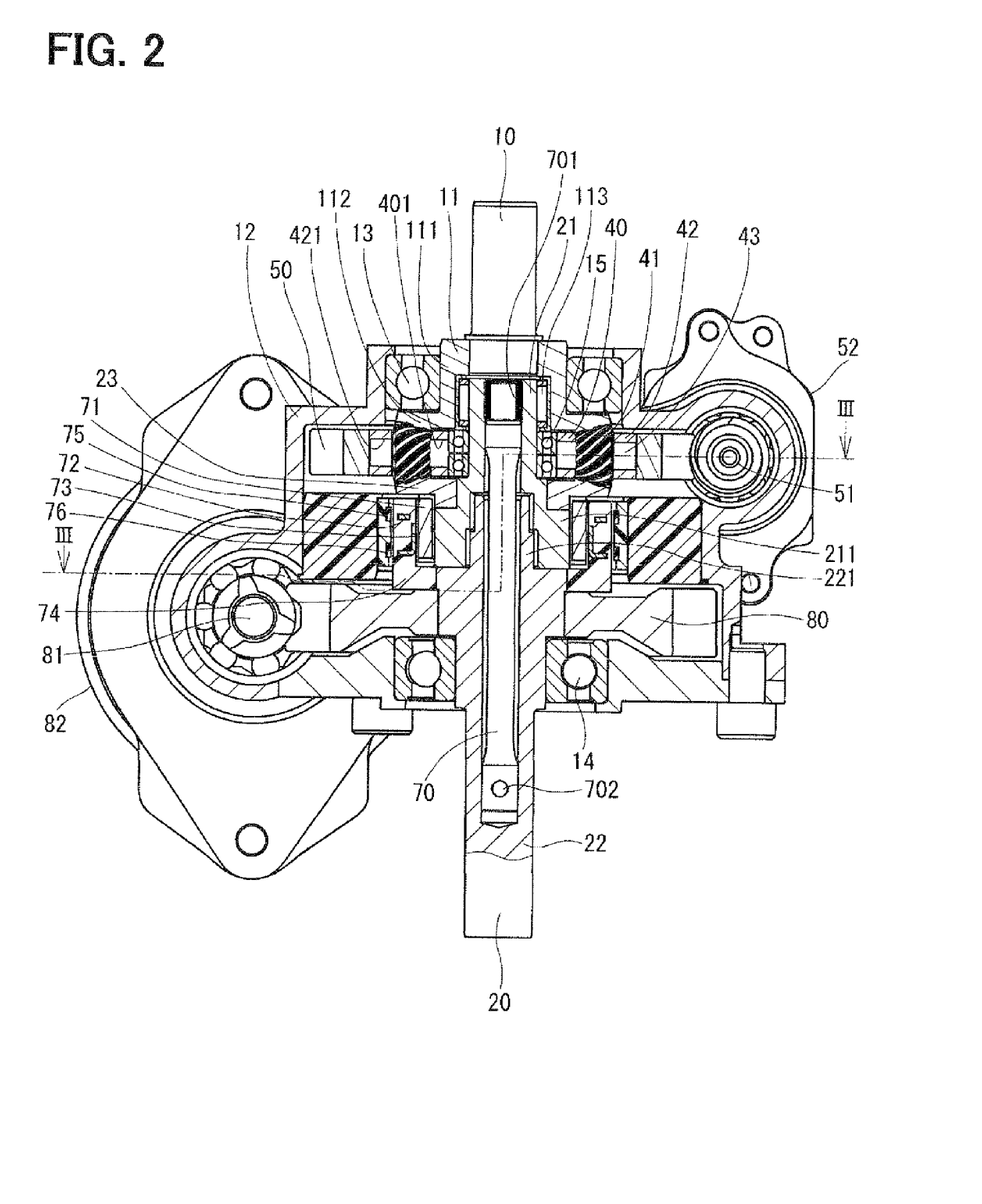
FIG. 2 is a cross-sectional view of the steering control system according to the first embodiment.
Figure 3:
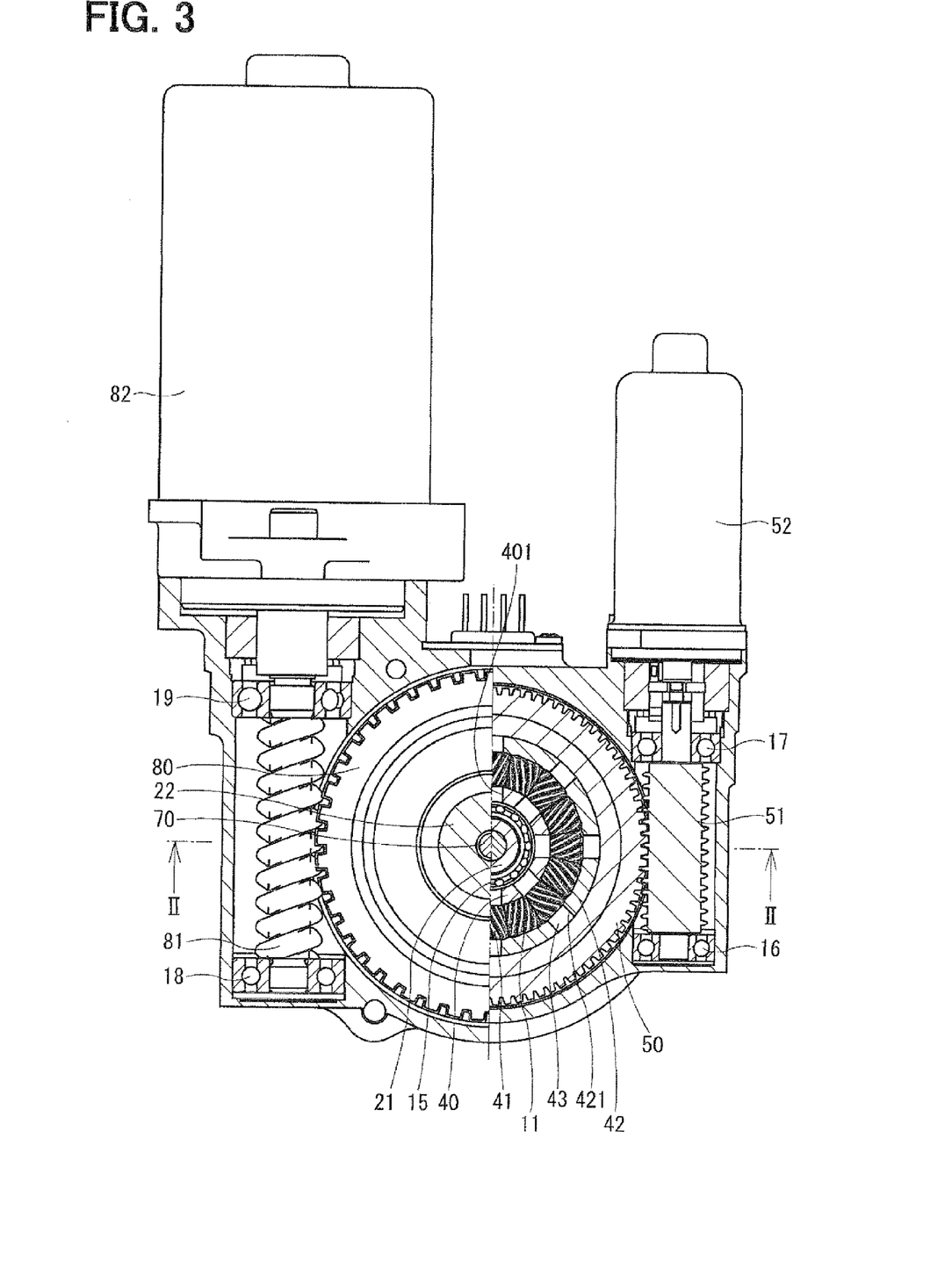
FIG. 3 is a cross sectional view taken along line III-III in FIG. 2.

The VGRS apparatus 3 has a differential gear and a worm gear. Specifically, as shown in FIGS. 1 to 3, the VGRS apparatus 3 includes an input shaft 10, an output shaft 20 an input gear 11, an output gear 23, an inner ring member 40, an outer ring member 42, pinion gear shaft members 43, pinion gears 41, a worm wheel 50, a worm 51 and an electric motor (a drive means) 52.

One end part of the input shaft 10 is coupled to a steering wheel 8, which is steerable by a driver of the vehicle. The input gear 11 is provided at the other end part of the input shaft 10, which is opposite from the steering wheel 8.

The input gear 11 is a bevel gear, which is meshed with the pinion gears (eight pinion gears in this instance) 41 discussed later, and is made of metal or resin. The input gear 11 includes a tubular portion 111 and a gear portion 112. The gear portion 112 is located radially outward of the tubular portion 111 and is configured into a right circular cone shape. An inner peripheral wall of an end part of the tubular portion 111, which is located on the axial side where the steering wheel 8 is located, is fixed to the input shaft 10. An outer peripheral wall of the end part of the tubular portion 111 is rotatably supported by a first bearing 13, which is provided at one end part of a housing 12. In this way, the input shaft 10 and the input gear 11 are rotatably supported by the housing 12.

The output shaft 20, which is placed coaxial with the input shaft 10, includes a first output shaft 21 and a second output shaft 22. The first output shaft 21 and the second output shaft 22 are configured as hollow pipes, respectively, each of which has a hollow interior. A large diameter portion 211 is formed at an end part of the first output shaft 21, which is opposite from the input shaft 10. The large diameter portion 211 has a large inner diameter. A small diameter portion 221 is formed at an end part of the second output shaft 22, which is located on an axial side where the input shaft 10 is placed. An inner peripheral wall of the large diameter portion 211 and an outer peripheral wall of the small diameter portion 221 overlaps with each other in the radial direction, so that the first output shaft 21 and the second output shaft 22 are coupled with each other in a manner that permits a relative rotation therebetween. The first output shaft 21 and the second output shaft 22 are relatively rotatably coupled by a torsion bar 70 discussed in detail later.

An end part of the first output shaft 21, which is located on the axial side where the input shaft 10 is located, is fitted to an inner peripheral wall of a needle bearing 113 that is installed to the inner peripheral wall of the tubular portion 111. The second output shaft 22 is fitted to an inner peripheral wall of a second bearing 14, which is installed to the other end part of the housing 12.

The output gear 23 is installed to the outer peripheral wall of the first output shaft 21, which is axially opposed to the gear portion 112 of the input gear 11. The output gear 23 is a bevel gear, which is meshed with the pinion gears 41, and is made of metal or resin. The first output shaft 21, the second output shaft 22 and the output gear 23 are supported by the needle bearing 113 and the second bearing 14 in a rotatable manner relative to the input gear 11 and the housing 12.

A third bearing 15 is fitted to the outer peripheral wail of the first output shaft 21 at an axial location between the input gear 11 and the output gear 23. The inner ring member 40 is fitted to an outer peripheral wall of the third bearing 15. The outer ring member 42 is coaxial with and is placed at radially outward of the inner ring member 40 such that the pinion gears 41 are received between the inner ring member 40 and the outer ring member 42.

Figure 4:
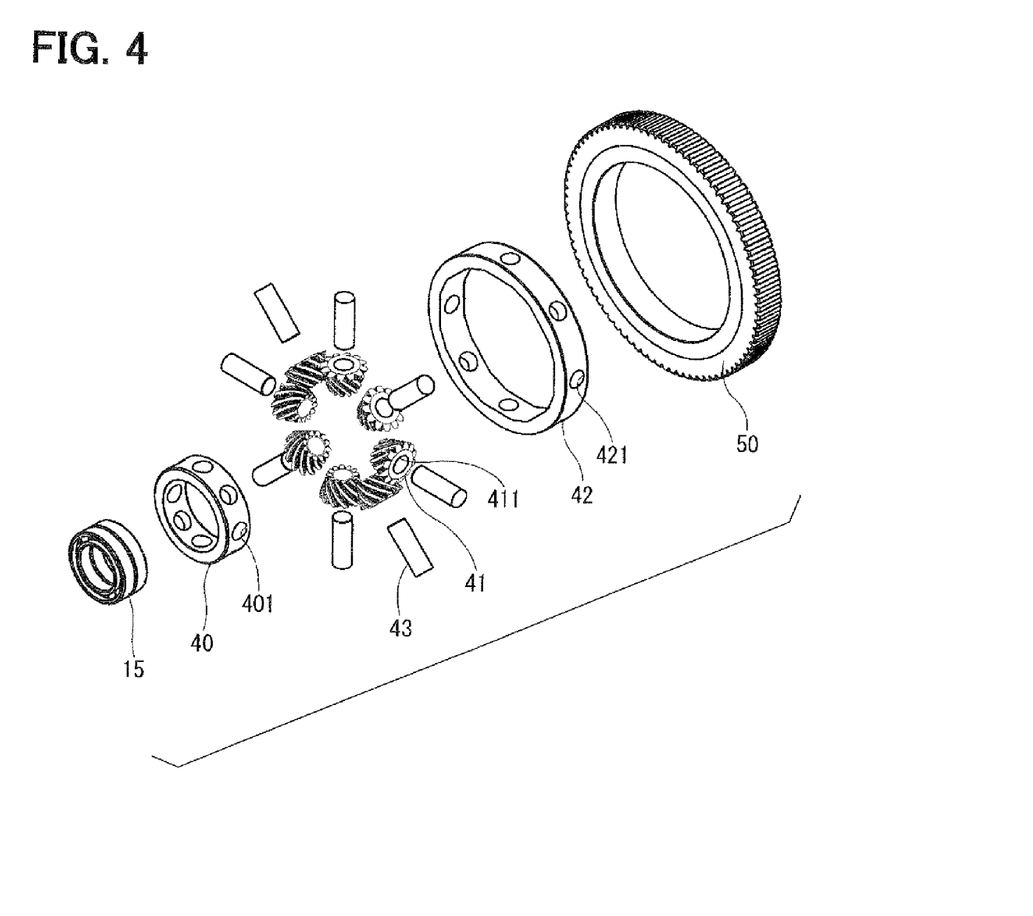
FIG. 4 is an exploded view of some components of the steering control system of the first embodiment.

As shown in FIG. 4, the inner ring member 40 has a plurality of primary holes 401, each of which radially extends through the inner ring member 40 in a corresponding direction perpendicular to the rotational axis of the first output shaft 21. The primary holes 401 are arranged one after another at generally equal intervals in the circumferential direction. The outer ring member 42 has a plurality of secondary holes 421, each of which corresponds to, i.e., radially aligned to a corresponding one of the primary holes 401 and radially extends through the outer ring member 42 in the corresponding direction perpendicular to the rotational axis of the first output shaft 21. Each pinion gear 41 is formed as a bevel gear, which is meshed with the input gear 11 and the output gear 23. Each pinion gear 41 has a shaft hole 411, which radially extends in the corresponding direction that is perpendicular to the rotational axis of the first output shaft 21. In an exemplary case where the input gear 11 and the output gear 23 are made of metal, the pinion gears 41 are made of resin. In another exemplary case where the input gear 11 and the output gear 23 are made of resin, the pinion gears 41 are made of resin or metal.

As shown in FIGS. 2 and 3, one end part of each pinion gear shaft member 43, which is received through the shaft hole 411 of the corresponding pinion gear 41, is fitted to an inner peripheral wall of the corresponding primary hole 401 of the inner ring member 40, and the other end part of the pinion gear shaft member 43 is fitted to an inner peripheral wall of the corresponding secondary hole 421 of the outer ring member 42. An inner diameter of the shaft hole 411 of each pinion gear 41 is slightly larger than an outer diameter of the corresponding pinion gear shaft member 43. Thereby, the pinion gear 41 is rotatable about the axis of the pinion gear shaft member 43.

Each of the input gear 11, the output gear 23 and the pinion gears 41 is formed as a spiral bevel gear, in which the leading edges (or tooth traces) of the teeth are curved, i.e., in which each of the teeth is curved along a length of the tooth. Therefore, a high tooth-to-tooth contact ratio between the input gear 11 and the pinion gear 41 and a high tooth-to-tooth contact ratio between the output gear 23 and the pinion gear 41 are achieved.

The number of teeth of each pinion gear 41 is even (i.e., the even number), so that the pinion gear 41 can reliably mesh with the input gear 11 and the output gear 23. The number of teeth of the input gear 11 is odd (i.e., the odd number). The number of teeth of the output gear 23 is odd (the odd number), which is the same odd number as that of the input gear 11. Thereby, each tooth of the input gear 11 contacts different teeth of the pinion gear 41 one after another as it rotates. Similarly, each tooth of the output gear 23 contacts different teeth of the pinion gear 41 one after another as it rotates. In this way, wearing of any particular one or some of the teeth will not be progressed in comparison to the other remaining teeth. In other words, the teeth are generally equally worn with time. Thereby, it is possible to limit a deterioration in the durability of the gears, which would be caused by the biased wearing of the teeth.

The worm wheel 50 is fitted to an outer peripheral wall of the outer ring member 42. The worm wheel 50, the inner ring member 40, the pinion gear shaft members 43, the outer ring member 42 and the pinion gears 41 are supported by the third bearing 15 in a rotatable manner about the rotational axis of the first output shaft 21.

The worm 51 is meshed with the worm wheel 50 at a location radially outward of the worm wheel 50. One end part of the worm 51 is rotatably supported by a fourth bearing 16, which is installed to the housing 12, and the other end part of the worm 51 is rotatable supported by a fifth bearing 17, which is installed to the housing 12.

The electric motor 52 is placed at the other end part of the worm 51 to rotate the worm 51 in a forward rotational direction or a backward rotational direction upon energization thereof.

When the electric motor 52 rotates the worm 51 in the forward rotational direction to rotate the worm wheel 50 in the same rotational direction as the rotational direction of the input shaft 10, the rotational speed of the input shaft 10 is decelerated, and this decelerated rotation is conducted to the output shaft 20. In contrast, when the electric motor 52 rotates the worm 51 in the backward rotational direction to rotate the worm wheel 50 in the opposite rotational direction, which is opposite from the rotational direction of the input shaft 10, the rotational speed of the input shaft 10 is accelerated, and this accelerated rotation is conducted to the output shaft 20. Therefore, a transmission ratio between the rotational angle of the input shaft 10 and the rotational angle of the output shaft 20 can be controlled by controlling the forward and backward rotations of the electric motor 52.

Figure 5:
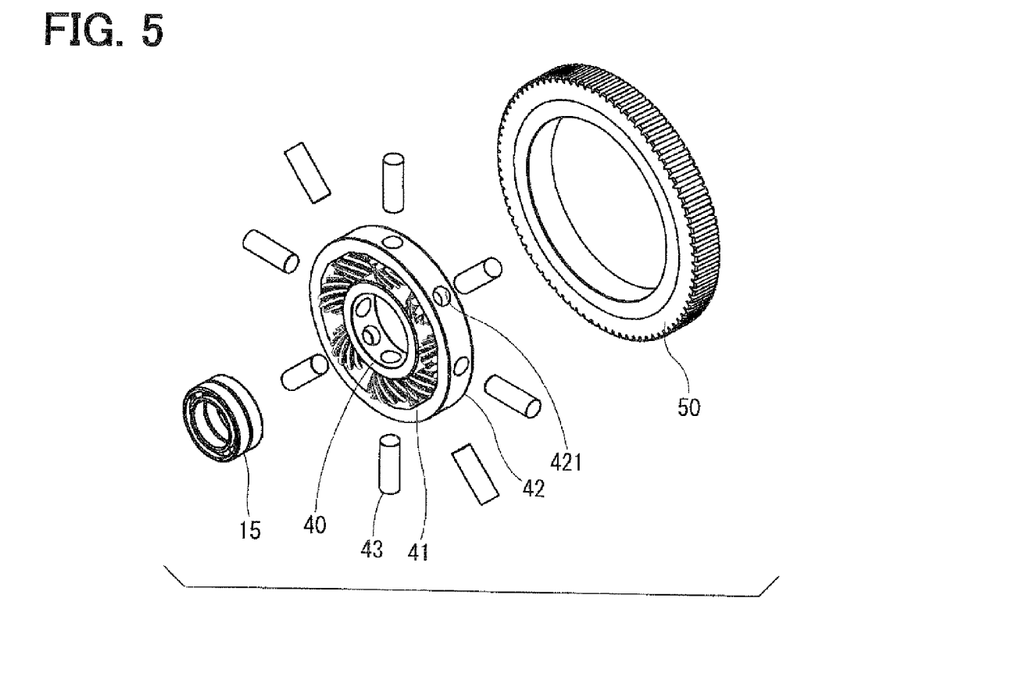
FIG. 5 is an exploded view showing a partially assembled state of the components of the steering control system shown in FIG. 4.
Figure 6:
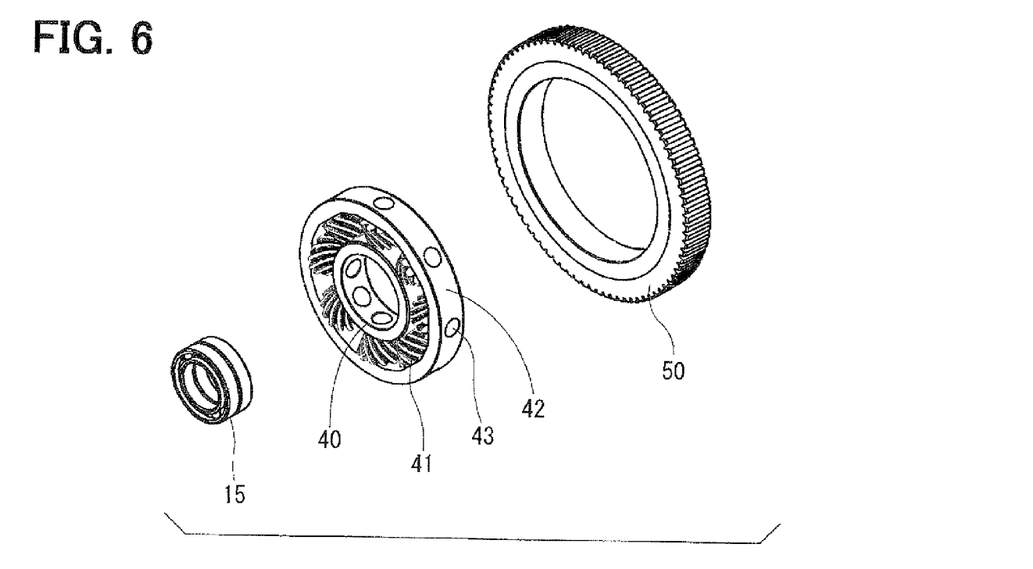
FIG. 6 is an exploded view showing another partially assembled state of the components of the steering control system shown in FIGS. 4 and 5.

Next, an assembling procedure for assembling the third bearing 15, the inner ring member 40, the pinion gears 41, the outer ring member 42, the pinion gear shaft members 43 and the worm wheel 50 will be described with reference to FIGS. 4 to 6.

First of all, the inner ring member 40, the pinion gears 41 and the outer ring member 42 are placed such that the center line of each of the primary holes 401 of the inner ring member 40 coincides with the center line of the corresponding one of the secondary holes 421 of the outer ring member 42.

Then, each of the pinion gear shaft members 43 is inserted into the corresponding secondary hole 421 of the outer ring member 42, the shaft hole 411 of the corresponding pinion gear 41 and the corresponding primary hole 401 of the inner ring member 40 in this order from the radially outer side of the outer ring member 42. At this time, the inner one end part of the pinion gear shaft member 43 is fitted to the inner peripheral wall of the corresponding primary hole 401 of the inner ring member 40, and the outer end part of the pinion gear shaft member 43 is fitted to the inner peripheral wall of the secondary hole 421 of the outer ring member 42.

Thereafter, the inner peripheral wall of the inner ring member 40 is fitted to the outer peripheral wall of the third bearing 15. Furthermore, the outer peripheral wall of the outer ring member 42 is fitted to the inner peripheral wall of the worm wheel 50.

Then, as shown in FIG. 2, the inner peripheral wall of the third bearing 15 is fitted to the outer peripheral wall of the first output shaft 21, to which the output gear 23 is fitted. Thereafter, the input shaft 10 and the input gear 11 are positioned in place, so that the assembling of the differential gear is completed.

Next, the relationship between the worm wheel 50 and the worm 51 will be described with reference to FIGS. 7 to 10.

Figure 7:
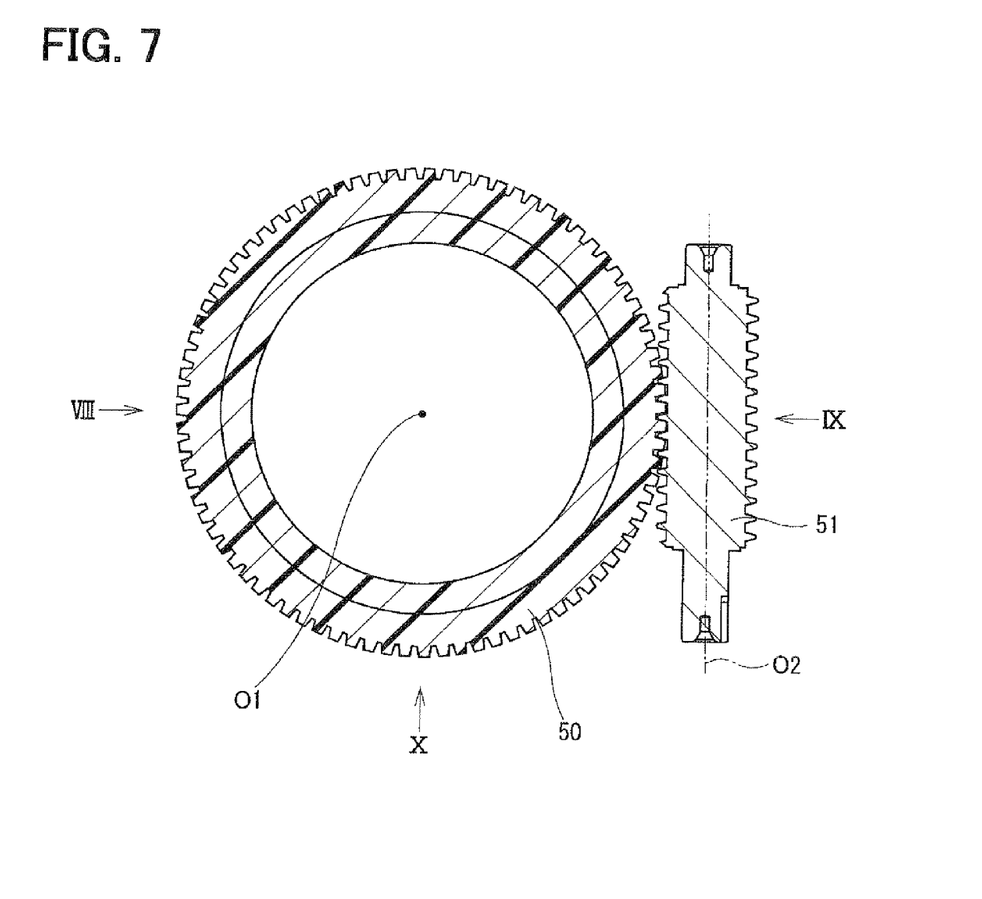
FIG. 7 is a cross-sectional view showing a worm and a worm wheel of the steering control system of the first embodiment taken along line VII-VII in FIG. 10.
Figure 8:
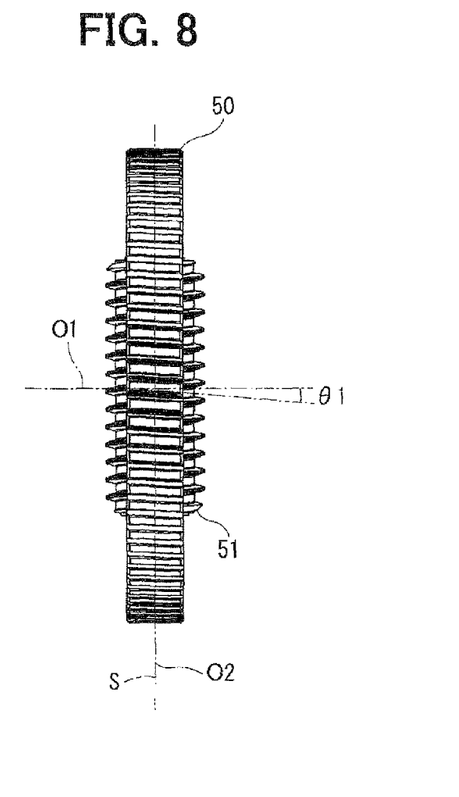
FIG. 8 is a view take in a direction of an arrow VIII in FIG. 7.
Figure 9:
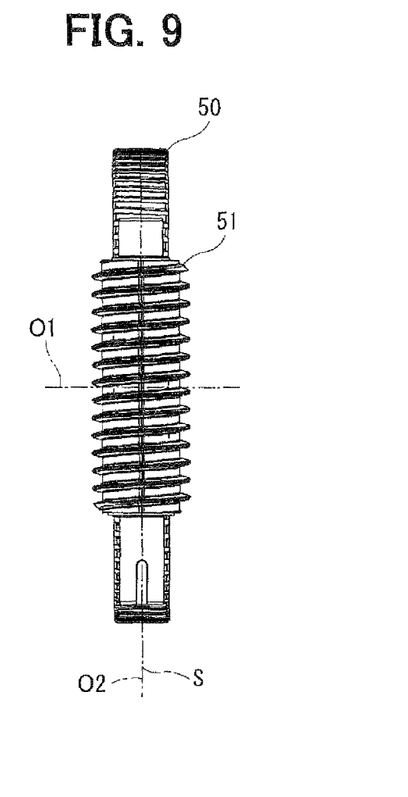
FIG. 9 is a view taken in a direction of an arrow IX in FIG. 7.
Figure 10:
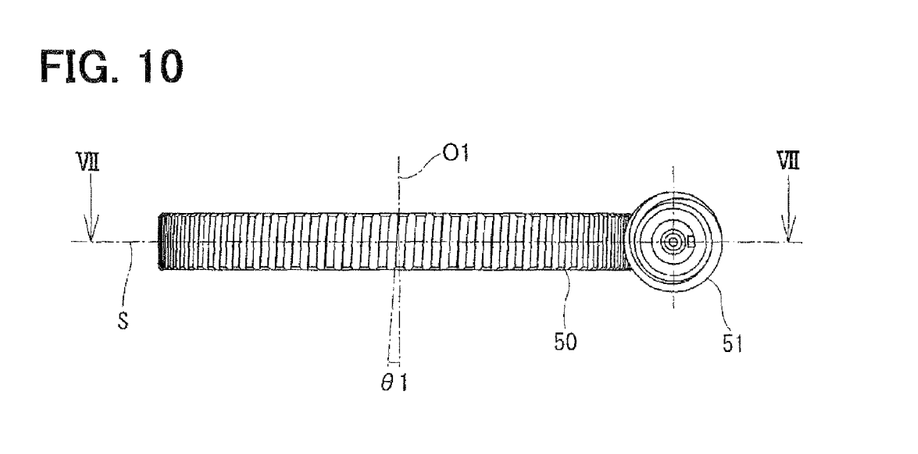
FIG. 10 is a view taken in a direction of an arrow X in FIG. 7.

The worm 51 is placed in parallel with the worm wheel 50. Specifically, the worm 51 is placed such that a plane S, which is perpendicular to the rotational axis O1 of the worm wheel 50, is generally parallel to the rotational axis O2 of the worm 51.

The worm wheel 50 is made of resin or metal, and the leading edges (or tooth traces) of the teeth of the worm wheel 50 are tilted relative to the rotational axis O1 of the worm wheel 50. Furthermore, a radial distance between the rotational axis O1 of the worm wheel 50 and each bottom land of the worm wheel 50, which is a surface between flanks of two adjacent teeth of the worm wheel 50, is made constant all around the worm wheel 50.

A lead angle $\theta 1$ of the worm wheel 50 and of the worm 51 is set to be smaller than a friction angle, so that self-locking of the worm wheel 50 and the worm 51 is made possible.

Next, the steering torque sensing apparatus 4 will be described.

As shown in FIG. 2, the steering torque sensing apparatus 4 includes the torsion bar 70, a multipolar magnet 71, a pair of magnetic yokes 72, 73, a pair of magnetic flux collecting rings 75, 76 and a magnetic sensor, such as a Hall IC (not shown). The multipolar magnet 71, the magnetic yokes 72, 73, the magnetic flux collecting rings 75, 76 and the magnetic sensor (not shown) serve as a torque sensor of the present invention.

The torsion bar 70 is placed radially inward of the hollow first and second output shafts 21, 22, i.e., is placed in the interiors of the first and second output shafts 21, 22. Serrations 701 are formed in the outer peripheral wall of the one end part of the torsion bar 70 and are engaged with serrations formed in the inner peripheral wall of the first output shaft 21. The other end part of the torsion bar 70 is connected to the second output shaft 22 through a pin 702. In this way, the torsion bar 70 connects between the first output shaft 21 and the second output shaft 22 in a manner that enables the relative rotation between the first output shaft 21 and the second output shaft 22 when the torsion bar 70 is twisted. Furthermore, when the torsional torque is applied between the first output shaft 21 and the second output shaft 22, the torsion bar 70 is twisted at a constant elastic modulus about the axis thereof. Therefore, the torque, which is applied between the first output shaft 21 and the second output shaft 22, is converted into a torsional displacement by the torsion bar 70.

The multipolar magnet 71, the magnetic yokes 72, 73 and the magnetic flux collecting rings 75, 76 are spaced from the output gear 23 by a small gap.

The multipolar magnet 71 is configured into an annular body and is fitted to the outer peripheral wall of the first output shaft 21 on the axial side of the output gear 23 where the steerable wheels 7 are located. The multipolar magnet 71 is fixed to the first output shaft 21 to rotate integrally with the first output shaft 21. The multipolar magnet 71 is magnetized to have a plurality of N-poles and a plurality of S-poles, which are alternately arranged one after another in the circumferential direction.

The magnetic yokes 72, 73 are placed radially outward of the multipolar magnet 71 such that the magnetic yokes 72, 73 are located within a magnetic field generated by the multipolar magnet 71. An annular body of the magnetic yoke 72 and an annular body of the magnetic yoke 73 are opposed to each other in the axial direction such that a plurality of teeth, which project from the annular body of the magnetic yoke 72, a plurality of teeth, which project from the annular body of the magnetic yoke 73, are alternately arranged one after another in the circumferential direction. A molded resin body 74, in which the magnetic yokes 72, 73 are integrally resin molded, is fitted to the outer peripheral wall of the second output shaft 22 through a collar (not shown). Thereby, the magnetic yokes 72, 73 are fixed to the second output shaft 22 to rotate integrally with the second output shaft 22.

The magnetic flux collecting ring 75 is placed radially outward of the magnetic yoke 72, and the magnetic flux collecting ring 76 is placed radially outward of the magnetic yoke 73. Each of the magnetic flux collecting rings 75, 76 is configured into an annular form and is placed such that a relative rotation between the magnetic flux collecting rings 75, 76 and the molded resin body 74 is enabled.

The magnetic sensor is placed in an air gap (not shown), which is defined between the magnetic flux collecting ring 75 and the magnetic flux collecting ring 76, to sense the density of the magnetic flux generated in the air gap.

Next, the operation of the steering torque sensing apparatus 4 will be described.

In a state where the steering torque is not inputted to the output shaft 20, and thereby the torsional displacement is not generated in the torsion bar 70, a circumferential center of each of the teeth of the magnetic yokes 72, 73 coincides with, i.e., is radially opposed to a boundary between the corresponding adjacent N-pole and S-pole. At this time, the amount of magnetic lines of force, which are applied from the N-poles of the multipolar magnet 71 to the teeth of the magnetic yokes 72, 73, is the same as the amount of magnetic lines of force, which are applied from the S-poles of the multipolar magnet 71 to the teeth of the magnetic yokes 72, 73. Therefore, the magnetic lines of force in the interior of the magnetic yoke 72 and the magnetic lines of force in the interior of the magnetic yoke 73 are closed. Therefore, the magnetic flux will not be leaked into the air gap, which is defined between the magnetic flux collecting ring 75 and the magnetic flux collecting ring 76, so that the density of magnetic flux, which is sensed with the magnetic sensor, becomes 0 (zero).

In contrast, when the steering torque is supplied to the output shaft 20 to cause the twisting of the torsion bar 70, the relative position between the multipolar magnet 71 and the magnetic yokes 72, 73 changes. Thereby, the circumferential center of each of the teeth of the magnetic yokes 72, 73 no longer coincides with the boundary between the corresponding N-pole and S-pole, so that the amount of magnetic lines of force, which are applied from the N-poles of the multipolar magnet 71 to the teeth of the magnetic yokes 72, 73, or the amount of magnetic lines of force, which are applied from the S-poles of the multipolar magnet 71 to the teeth of the magnetic yokes 72, 73, are increased. Thus, the density of the magnetic flux is generated in the air gap, which is defined between the magnetic flux collecting ring 75 and the magnetic flux collecting ring 76. This density of magnetic flux is generally proportional to the torsional displacement of the torsion bar 70, and the magnet polarities are reversed in the direction of the twist of the torsion bar 70. Therefore, when the density of the magnetic flux is sensed with the magnetic sensor, the torsional displacement of the first output shaft 21 and of the second output shaft 22 can be obtained as a corresponding voltage signal.

Next, the EPS apparatus 5 will be described.

As shown in FIGS. 2 and 3, the EPS apparatus 5 includes an EPS worm wheel 80, an EPS worm 81, an EPS electric motor (serving as an electric power steering drive means) 82. The EPS worm wheel 80 and the EPS worm 81 are received in the housing 12 of the steering torque sensing apparatus 4.

The EPS worm wheel 80 is made of resin or metal and is placed on the axial side of the molded resin body 74 where the steerable wheels 7 are located. An inner peripheral wall of the EPS worm wheel 80 is fitted to the outer peripheral wall of the second output shaft 2 to rotate integrally with the second output shaft 22.

The EPS worm 81 is placed on the radially outer side of the EPS worm wheel 80 and is meshed with the EPS worm wheel 80. One end part of the EPS worm 81 is rotatably supported by a sixth bearing 18, which is installed to the housing 12, and the other end part of the EPS worm 81 is rotatable supported by a seventh bearing 19, which is installed to the housing 12.

The leading edges (or tooth traces) of the teeth of the EPS worm wheel 80 are generally parallel to the rotational axis thereof. Furthermore, a radial distance between the rotational axis of the worm wheel 80 and each bottom land of the worm wheel 80, which is a surface between flanks of two adjacent teeth of the worm wheel 80, is made constant. With the above construction, even when the EPS worm wheel 80 is displaced in the axial direction of the second output shaft 22 due to presence of a manufacturing tolerance, the proper tooth contact between the EPS worm wheel 80 and the EPS worm 81 can be maintained during the forward rotation and the backward rotation thereof.

The EPS electric motor 82 is placed at the other end part of the EPS worm 81. The EPS electric motor 82 is placed on the opposite side of the output shaft 20, which is opposite from the electric motor 52. An electronic control unit (ECU), which is not depicted in the drawings, executes the duty control the electric current, which is supplied to the EPS electric motor 82 according to the steering torque, which is sensed based on the voltage signal outputted from the magnetic sensor. When the electric current is supplied from this control unit to the EPS electric motor 82, the EPS electric motor 82 rotates the EPS worm 81 in the forward or backward rotational direction, so that the EPS worm wheel 80, which is meshed with the EPS worm 81, provides the steering assist force to the second output shaft 22. Thereby, the steering force is assisted.

Next, the steering gear box 6 will be described.

As shown in FIG. 1, the steering gear box 6 includes a steering pinion gear 60 and a steering rack bar 61 and is placed on a vehicle rear side of an imaginary straight line L, which connects between rotational axes of the left and right steerable wheels 7.

The steering pinion gear 60 is provided to an end part of a shaft 24, which is connected to the output shaft 20 through a universal joint 9. The steering pinion gear 60 is rotated together with the output shaft 20 and the shaft 24.

The steering rack bar 61 is placed in a manner that enables displacement of the steering rack bar 61 in the left-to-right direction of the vehicle, and rack teeth 62 of the steering rack bar 61 are meshed with the steering pinion gear 60. Thereby, the steering rack bar 61 forms the rack-and-pinion mechanism in corporation with the steering pinion gear 60. With the above construction, the steering rack bar 61 converse the rotational motion of the steering pinion gear 60 into an axial linear motion in the axial direction of the rack bar 61.

The left and right steerable wheels 7 are connected to opposed end parts of the steering rack bar 61 through tie rods and knuckle arms in a manner that enables the steering of the left and right steerable wheels 7. Therefore, the left and right steerable wheels 7 change the steering angle thereof according to the amount of axial displacement of the steering rack bar 61.

The steering gear box 6 forms the steering pinion gear 60 and the steering rack bar 61 such that a distance B between the imaginary straight line L, which connects between the rotational axes of the left and right steerable wheels 7, and the steering pinion gear 60 is longer than a distance A between the imaginary straight line L and the steering rack bar 61.

Therefore, when the steering pinion gear 60 is rotated in the clockwise direction in the view taken from the universal joint 9 side of the shaft 24, the steering rack bar 61 is moved in the right direction, and thereby the steerable wheels 7 change the steering angle to steer the vehicle toward the left side. In contrast, when the steering pinion gear 60 is rotated in the counter-clockwise direction in the view taken from the universal joint 9 side of the shaft 24, the steering rack bar 61 is moved in the left direction, and thereby the steerable wheels 7 change the steering angle to steer the vehicle toward the right side.

As discussed above, when the steering pinion gear 60 and the steering rack bar 61 satisfy the relationship of A<B, the steerable wheels 7 are steered in the opposite direction, which is opposite from the rotational direction of the output shaft 20. Thereby, the rotational direction of the steering wheel 8 and the steering angle of the steerable wheels 7 are coincided.

Now, advantages of the first embodiment will be described.

In the steering control system 1 of the present embodiment, each pinion gear shaft member 43, which rotatably supports the corresponding pinion gear 41, is formed to linearly extend and has the single axis. The inner end part (one end part) of the pinion gear shaft member 43 is fitted to the inner peripheral wall of the corresponding primary hole 401 of the inner ring member 40, and the outer end part (other end part) of the pinion gear shaft member 43 is fitted to the inner peripheral wall of the corresponding secondary hole 421 of the outer ring member 42. Therefore, the manufacturing and the assembling of the pinion gear shaft member 43 can be easily performed.

The differential gear of the VGRS apparatus 3 reverses the rotational direction of the output shaft 20 with respect to the rotational direction of the steering wheel 8. Therefore, the steering gear box 6 is constructed such that the steering pinion gear 60 and the steering rack bar 61 are placed to satisfy the positional relationship of A<B. In this way, it is possible to provide the steering control system 1, which is made compact to minimize the required installation space thereof, without having, for example, the gear apparatus, which reverses the rotational direction of the output shaft 20 once again.

The first output shaft 21 and the second output shaft 22 are coupled with each other by overlapping the inner peripheral wall of the large diameter portion 211 and the outer peripheral wall of the small diameter portion 221 in the radial direction while allowing the relative rotation therebetween. The needle bearing 113, which is installed to the inner peripheral wall of the input gear 11, rotatably supports the end part of the first output shaft 21, which is located on the axial side where the input shaft 10 is located. The second bearing 14, which is installed to the housing 12, rotatably supports the second output shaft 22. In this way, the tilting of the rotational axis of the first output shaft 21 is limited, and thereby the proper tooth contact position, at which the worm wheel 50 and the worm 51 are engaged with each other, can be reliably maintained. Therefore, it is possible to avoid the disadvantages, such as the increase of the backlash, the increase of the operational noise and the reduction of the transmission efficiency, which are caused by the deviation in the tooth contact position between the meshed gears.

At least one of the input gear 11 and each pinion gear 41, which are meshed with each other, is made of the resin material. Furthermore, at least one of each pinion gear 41 and the output gear 23, which are meshed with each other, is made of the resin material. Thereby, it is possible to reduce the level of the gear rattle sound, which is generated at the time of occurrence of the collision of the teeth of the one of the meshed gears with the teeth of the other one of the meshed gears.

Furthermore, in each of the input gear 11, the output gear 23 and the pinion gear 41, the leading edges (or tooth traces) of the teeth are curved. Thereby, there is achieved the high contact ratio between the gears, which are meshed with each other. As a result, it is possible to reduce the operational noises, which are generated through the collision of the teeth of the one of the meshed gears to the teeth of the other one of the meshed gears. Also, it is possible to reduce the feeling of the pulsation transmitted from the steering wheel 8 to the driver of the vehicle.

Furthermore, the number of teeth of the input gear 11 and the number of teeth of the output gear 23 are equal to each other and are odd, i.e., are the same odd number, and the number of teeth of each pinion gear 41 is the even number. Thereby, each tooth of the input gear 11 contacts different teeth of the pinion gear 41 one after another as it rotates. Similarly, each tooth of the output gear 23 contacts different teeth of the pinion gear 41 one after another as it rotates. In this way, wearing of any particular one or some of the teeth will not be progressed in comparison to the other remaining teeth. In other words, the teeth are generally equally worn with time. Thereby, it is possible to limit a deterioration in the durability of the gears, which would be caused by the biased wearing of the teeth. Furthermore, it is possible to reduce the operational noises, which are generated by the collision of the teeth of the one of the meshed bevel gears with the teeth of the other one of the meshed bevel gears, and it is possible to reduce the feeling of the pulsation conducted from the steering wheel 8 to the driver of the vehicle.

One end part of the torsion bar 70 is securely coupled with the inner peripheral wall of the first output shaft 21 on the one axial side of the output gear 23 where the input gear 11 is located. Thereby, the torque sensor, which senses the twist angle between the first output shaft 21 and the second output shaft 22, can be placed adjacent to the end surface of the output gear 23, which is located on the axial side where the steerable wheels 7 are located. Thus, the size of the steering control system 1 can be reduced. As a result, it is possible to provide the steering control system, which requires the less installation space on the vehicle, thereby improving the installability thereof.

Furthermore, the steering control system 1 includes the VGRS apparatus 3, the steering torque sensing apparatus 4 and the EPS apparatus 5, which are integrated together and are received in the same common housing. Therefore, by reducing the size of the steering control system 1, it is possible to install the steering control system 1 to the steering column while ensuring the required installation space for installing the collision shock absorber, which is required under the regulations, such as ECE 12, 74/297/EEC, FMVSS203 and Japanese Road Trucking Vehicle Act Section 11.

The worm 51 and the EPS worm 81 are placed on the one lateral side (the right side in FIG. 2) and the other lateral side (the left side in FIG. 2), respectively of the output shaft 20. Therefore, the radial load, which is generated through the rotation of the worm wheel 50 driven by the worm 51, can be canceled by the radial load, which is generated through the rotation of the EPS worm wheel 80 driven by the EPS worm 81. In this way, the tilt of the output shaft 20 is limited, and the appropriate tooth contact position between the worm 51 and the worm wheel 50 and the appropriate tooth contact position between the EPS worm 81 and the EPS worm wheel 80 can be reliably maintained. Therefore, it is possible to avoid the disadvantages, such as the increase of the backlash, the increase of the operational noise and the reduction of the transmission efficiency, which are caused by the deviation in the tooth contact position between the meshed gears. Furthermore, since the radial loads are canceled with each other, the radial load, which is applied to the output shaft 20 is reduced. Therefore, the diameter of the output shaft 20 can be reduced to reduce the size of the steering control system 1.

The worm wheel 50 and the worm 51 are each set to have the lead angle θ1, which enables the self-locking of the worm wheel 50 and the worm 51. Therefore, in the case where the steering ratio is set to 1:1, the energization of the electric motor 52 is not required. Therefore, the power consumption can be reduced. Furthermore, at the time of failure of the electric motor 52 or the control circuit for controlling the electric motor 52, a relay may be provided in the electric path of the electric motor 52. At the time of failure of the electric motor 52 or the control circuit thereof, the relay may be operated to turn off the electric power supply to the electric motor 52, so that the steering ratio can be maintained at 1:1.

Furthermore, in each of the worm wheel 50 and the EPS worm wheel 80, the radial distance between each bottom land of the worm wheel 50, 80 and the rotational axis of the worm wheel 50, 80 is made constant all around it. In this way, even when the positions of the worm wheel 50 and the worm 51 and/or the positions of the EPS worm wheel 80 and the EPS worm 81 are deviated in the direction of the rotational axis due to the presence of the manufacturing tolerance, the appropriate tooth contact state between the worm wheel 50, 81 and the worm 51, 81 can be maintained in the forward rotational operation and in the backward rotational operation. Therefore, it is possible to avoid or alleviate the disadvantages in the controlling operation caused by the change in the transmission efficiency between the forward rotational operation and the backward rotational operation as well as the disadvantages in terms of the sensations of the driver and/or the other passenger(s) of the vehicle caused by the increase in the operational noises.

Second Embodiment

Figure 11:
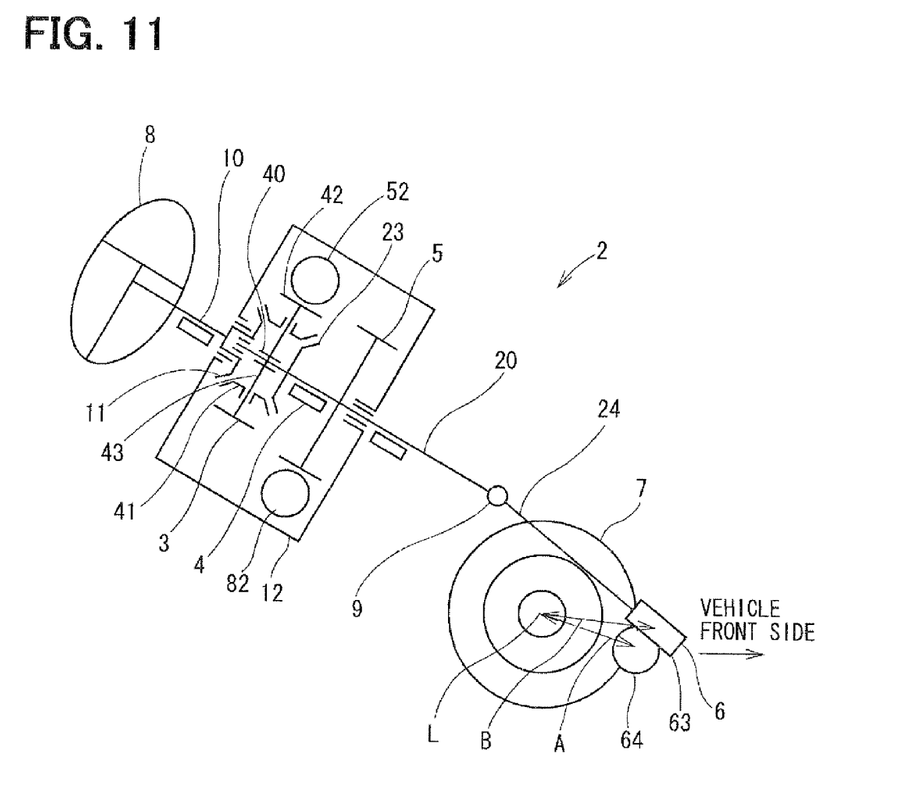
FIG. 11 is a schematic diagram showing a steering control system according to a second embodiment of the present invention.

FIG. 11 shows a steering control system 2 according to a second embodiment of the present invention. In the present embodiment, components, which are similar to those of the first embodiment, will be indicated by the same reference numerals and will not be described redundantly.

In the present embodiment, the steering gear box 6 is placed on the vehicle front side of the imaginary straight line L, which connects between rotational axes of the left and right steerable wheels 7.

In the present embodiment, the steering gear boxy 6 form a steering pinion gear 63 and a steering rack bar 61 such that a distance B between the imaginary straight line L, which connects between eh rotational axes of the left and right steerable wheels 7, and the steering pinion gear 63 is longer than a distance A between the imaginary straight line L and the steering rack bar 64.

Therefore, when the steering pinion gear 63 is rotated in the clockwise direction in the view taken from the universal joint 9 side of the shaft 24, the steering rack bar 64 is moved in the left direction, and thereby the steerable wheels 7 change the steering angle to steer the vehicle toward the left side. In contrast, when the steering pinion gear 63 is rotated in the counter-clockwise direction in the view taken from the universal joint 9 side of the shaft 24, the steering rack bar 64 is moved in the right direction, and thereby the steerable wheels 7 change the steering angle to steer the vehicle toward the right side.

As discussed above, when the steering pinion gear 63 and the steering rack bar 64 satisfy the relationship of A<B, the steerable wheels 7 are steered in the opposite direction, which is opposite from the rotational direction of the output shaft 20. Thereby, the rotational direction of the steering wheel 8 and the steering angle of the steerable wheels 7 are coincided.

Third Embodiment

The steering control system of the third embodiment of the present invention has a characteristic feature in a worm wheel and a worm. The worm wheel 500 and the worm 510 of the present embodiment will be discussed with reference to FIGS. 12 to 15.

Figure 12:
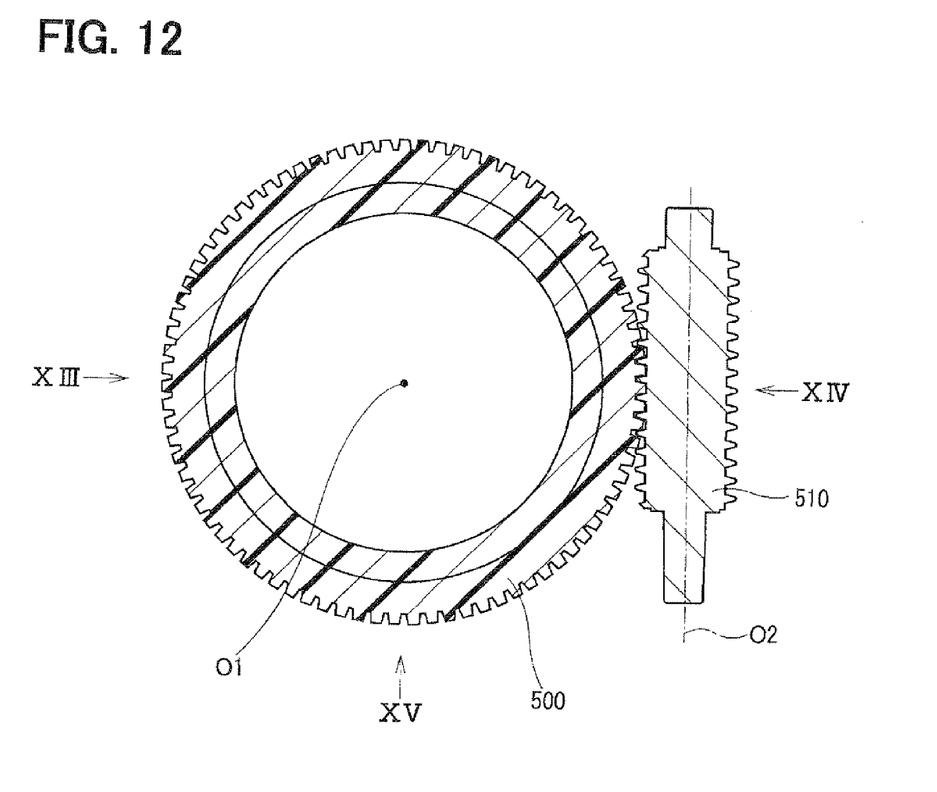
FIG. 12 is a cross-sectional view showing a worm and a worm wheel of a steering control system taken along line XII-XII in FIG. 15 according to a third embodiment of the present invention.
Figure 13:
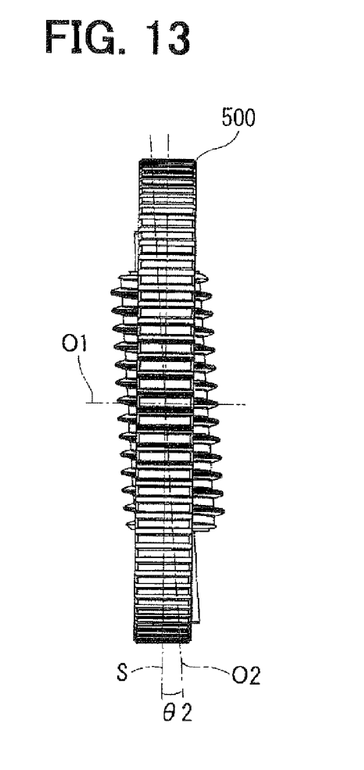
FIG. 13 is a view taken in a direction of arrow XIII in FIG. 12.
Figure 14:
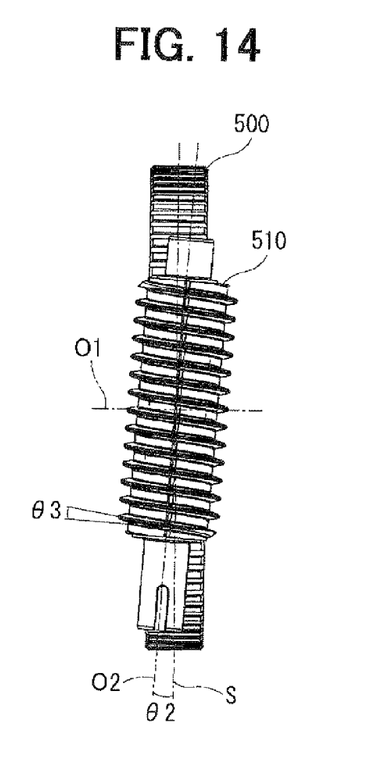
FIG. 14 is a view taken in a direction of arrow XIV in FIG. 12.
Figure 15:
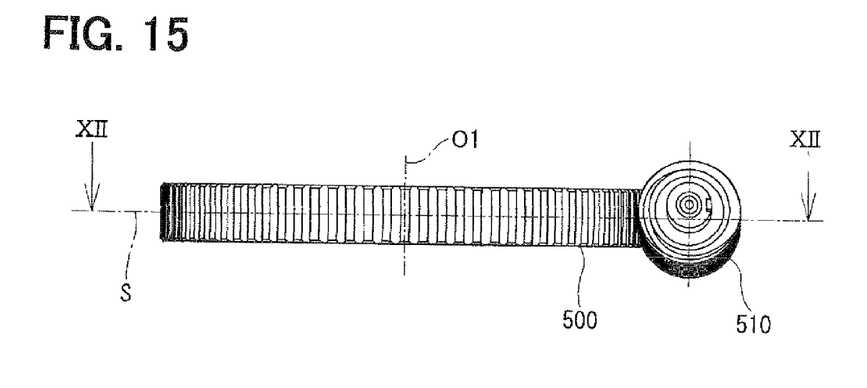
FIG. 15 is a view taken in a direction of arrow XV in FIG. 12.

In the present embodiment, the worm wheel 500 is formed such that the leading edges (or tooth traces) of the teeth of the worm wheel 500 are generally parallel to the rotational axis O1 of the worm wheel 500. Furthermore, the worm 510 is tilted relative to the worm wheel 500. Specifically, an angle θ2 is formed between a plane S, which is perpendicular to the rotational axis O1 of the worm wheel 500, and the rotational axis O2 of the worm 510. This angle θ2 is set to be substantially the same as a lead angle θ3 of the worm 510. Therefore, a contact surface between the tooth of the worm wheel 500 and the tooth of the worm 510 is generally parallel to the rotational axis O1 of the worm wheel 500 (see FIG. 13). With this construction, when the drive force is transmitted from the worm 510 to the worm wheel 500, it is possible to limit generation of a load on the worm wheel 500 in a thrust direction. Therefore, the appropriate tooth contact position between the worm 510 and the worm wheel 500 can be reliably maintained.

Furthermore, according to the present embodiment, in the case where the worm wheel 500 is made of resin, a punch die, which has cutting blades in an inner peripheral wall of a tubular member, is moved in the direction of the rotational axis O1. In this way, the resin molding of the worm wheel 500 is possible. Thus, a gear cutting process for individually cutting the teeth of the worm wheel 500 is not required, and thereby it is possible to reduce the manufacturing costs.

Now, modifications of the above embodiments will be described.

In the above embodiments, the number of teeth of the pinion gear 41 is set to be the even number, and the number of teeth of the input gear 11 and the number of teeth of the output gear 23 are set to be the same odd number. Alternatively, the number of teeth of the pinion gear may be set, to be an even number, and the number of teeth of the input gear 11 and the number of teeth of the output gear 23 may be set to be a common even number. Also, in the above embodiments, the number of the pinion gears 41 is the even number. Alternatively, the number of the pinion gears may be set to be an odd number. When the number of teeth of the pinion gear is set to be the even number, there is an increased degree of freedom with respect to the number of teeth of the input gear, the number of teeth of the output gear and the number of the pinion gears.

As discussed above, the steering control system of the present invention is not limited to the above embodiments, and the above embodiments may be modified within the spirit and scope of the invention.

What is claimed is:

1. A steering control system for a vehicle, comprising:
   an input shaft coupleable with a steering wheel of the vehicle;
   an output shaft coaxial with the input shaft and rotatable relative to the input shaft, wherein the output shaft transmits a steering force toward the steerable wheels of the vehicle;
   an input gear rotatable integrally with the input shaft;
   an output gear opposed to the input gear and rotatable integrally with the output shaft;
   an inner ring member rotatable about one portion of the output shaft that projects from one axial side of the output gear where the input gear is located, wherein the inner ring member has at least one primary hole;
   an, outer ring member placed radially outward of the inner ring member, wherein the outer ring member has at least one secondary hole;
   at least one pinion gear shaft member, extending in a respective direction that is generally perpendicular to a rotational axis of the input shaft and the output shaft, wherein said at least one pinion gear shaft member has an inner end part received in said at least one primary hole of the inner ring member, and an outer end part received in said at least one secondary hole of the outer ring member;
   at least one pinion gear, is rotatably supported by said at least one pinion gear shaft member at a location between the inner ring member and the outer ring member and meshed with the input gear and the output gear;
   a worm wheel fixed to an outer peripheral wall of the outer ring member;
   a worm meshed with the worm wheel; and
   a drive means for rotating the worm to control a transmission ratio between a rotational angle of the input shaft and a rotational angle of the output shaft.

2. The steering control system according to claim 1, further comprising:
   a steering pinion gear that is connected to another portion of the output shaft, which projects from another axial side of the output gear, where the steerable wheels are located, wherein the steering pinion gear is rotatable integrally with the output shaft; and
   a steering rack bar that is meshed with the steering pinion gear and coverts rotation of the steering pinion gear into linear motion in an axial direction of the steering rack bar to steer the steerable wheels, which are placed on a left side and a right side, respectively, of the vehicle, wherein a distance between an imaginary straight line, which connects between rotational centers of the steerable wheels, and the steering rack bar is shorter than a distance between the imaginary straight line and the steering pinion gear.

3. The steering control system according to claim 1, wherein:
   both the worm wheel and the worm have a same lead angle, which enables self-locking between the worm wheel and the worm; and
   when the drive means stops, the transmission ratio between the rotational angle of the input shaft and the rotational angle of the output shaft becomes a predetermined ratio.

4. The steering control system according to claim 1, wherein an end part of the output shaft, which is located adjacent to the input gear, is rotatably supported by a bearing, which is installed to the input gear.

5. The steering control system according to claim 1, wherein:
   the input gear, the at least one pinion gear and the output gear are formed as bevel gears, respectively, such that the input gear and the at least one pinion gear are coupled, and the at least one pinion gear and the output gear are coupled.

6. The steering control system according to claim 5, wherein the input gear, the output gear, and the at least one pinion gear each have a plurality of curved teeth, each of which is curved along a length of the tooth.

7. The steering control system according to claim 1, wherein:
   the number of teeth of the input gear and the number of teeth of the output gear are equal to each other and is an odd number; and
   the number of teeth of each of the at least one pinion gear is an even number.

8. The steering control system according to claim 1, wherein:
   the number of teeth of the input gear and the number of teeth of the output gear are equal to each other and is an even number;
   there is an odd number of pinion gears; and
   the number of teeth of each pinion gear is an even number.

9. The steering control system according to claim 1, wherein:
   at least one of 1) the input gear and 2) the at least one pinion gear is made of resin; and
   at least one of 1) the output gear and 2) the at least one pinion gear is made of resin.

10. The steering control system according to claim 1, wherein:
    the worm wheel has a plurality of teeth, each tooth is generally straight along a length of the tooth and is generally parallel to a rotational axis of the worm wheel; and
    an angle defined between a rotational axis of the worm and an imaginary plane that is perpendicular to a rotational axis of the worm wheel, is set to correspond with a lead angle of the worm.

11. The steering control system according to claim 1, wherein:
the output shaft comprises a first output shaft and a second output shaft, both said shafts having hollow interiors;
the inner ring member is rotatably installed on an outer peripheral wall of the first output shaft;
the output gear is fixed to the outer peripheral wall of the first output shaft;
the second output shaft is coaxial with and is rotatable relative to the first output shaft; and
the steering control system further comprises:
a torsion bar that has one end part that is coupled with an inner peripheral wall of the first output shaft on the one axial side of the output gear, where the input gear is located, and the torsion bar has another end part that is coupled with an inner peripheral wall of the second output shaft at a location that is on the other axial side of the output gear, where the steerable wheels are located, wherein the torsion bar is twistable at a constant elastic modulus about an axis of the torsion bar when a torsional torque is applied between the first output shaft and the second output shaft; and
a torque sensor that senses a twist angle between the first output shaft and the second output shaft on the other axial side of the output gear, where the steerable wheels are located.

12. The steering control system according to claim 11, further comprising:
an electric power steering worm wheel fixed to an outer peripheral wall of the output shaft at a location on one axial side of the torque sensor, where the steerable wheels are located;
an electric power steering worm meshed with the electric power steering worm wheel; and
an electric power steering drive means for rotating the electric power steering worm based on a steering torque that is computed based on an output signal of the torque sensor, wherein the input gear, the at least one pinion gear, the output gear and the electric power steering worm wheel are received in a common housing.

13. The steering control system according to claim 12, wherein:
the worm is placed on one lateral side of the output shaft; and
the electric power steering worm is placed on an opposite lateral side of the output shaft, which is opposite from the one lateral side of the output shaft.

14. The steering control system according to claim 13, wherein at least one of the worm wheel and the electric power steering worm wheel is configured such that a radial distance between a rotational axis thereof and each bottom land thereof is generally constant.

15. The steering control system according to claim 1, wherein:
the at least one primary hole comprises a plurality of primary holes in the inner ring member;
the at least one secondary hole comprises a plurality of secondary holes in the outer ring member;
the at least one pinion gear shaft member comprises a plurality of pinion gear shaft members, which are placed one after another in a circumferential direction; and
the at least one pinion gear comprises a plurality of pinion gears, each rotatably supported by a respective one of the plurality of pinion gear shaft members.

* * * * *